United States Patent
Asti et al.

(10) Patent No.: US 11,397,135 B2
(45) Date of Patent: Jul. 26, 2022

(54) METHOD OF DETECTING FLAMEOUT IN A COMBUSTOR AND TURBINE SYSTEM

(71) Applicant: General Electric Company, Schenectady, NY (US)

(72) Inventors: Antonio Asti, Florence (IT); Miriam Losapio, Florence (IT); Mariateresa Paci, Florence (IT); Giovanni Tonno, Florence (IT)

(73) Assignee: General Electric Company, Schenectady, NY (US)

( * ) Notice: Subject to any disclaimer, the term of this patent is extended or adjusted under 35 U.S.C. 154(b) by 100 days.

(21) Appl. No.: 17/141,596

(22) Filed: Jan. 5, 2021

(65) Prior Publication Data

US 2021/0123834 A1 Apr. 29, 2021

Related U.S. Application Data

(63) Continuation-in-part of application No. 15/919,735, filed on Mar. 13, 2018, now abandoned.

(30) Foreign Application Priority Data

Mar. 14, 2017 (IT) .................. 102017000028052

(51) Int. Cl.
*G01M 15/14* (2006.01)
*F02C 7/00* (2006.01)
*F02C 3/04* (2006.01)
*G08B 21/18* (2006.01)

(52) U.S. Cl.
CPC .............. *G01M 15/14* (2013.01); *F02C 3/04* (2013.01); *F02C 7/00* (2013.01); *G08B 21/182* (2013.01); *F05D 2220/32* (2013.01); *F05D 2240/35* (2013.01); *F05D 2260/83* (2013.01)

(58) Field of Classification Search
CPC .............. F02C 7/262; F05D 2270/092; F23N 2231/06; G01M 15/14
See application file for complete search history.

(56) References Cited

U.S. PATENT DOCUMENTS

| 4,454,754 A | 6/1984 | Zagranski et al. |
| 5,581,995 A | 12/1996 | Lucenko et al. |
| 6,442,943 B1 | 9/2002 | Harrison et al. |
| 7,902,999 B2 | 3/2011 | Eick |
| 2004/0200206 A1 | 10/2004 | McKelvey et al. |

(Continued)

FOREIGN PATENT DOCUMENTS

CA 1088181 A 10/1980

OTHER PUBLICATIONS

Italian Search Report and Written Opinion issued in connection with corresponding IT Application No. 102017000028052 dated Nov. 6, 2017, 7 pages.

(Continued)

*Primary Examiner* — Scott J Walthour
(74) *Attorney, Agent, or Firm* — Charlotte Wilson; Hoffman Warnick LLC

(57) ABSTRACT

The method allows to detect flameout in a combustor of a turbine system; it includes the steps of: A) measuring angular acceleration of a shaft of the or each turbine of the turbine system, B) calculating a flameout indicator as a function of the angular acceleration, and C) carrying out a comparison between the flameout indicator and at least one threshold.

7 Claims, 2 Drawing Sheets

(56) References Cited

U.S. PATENT DOCUMENTS

2016/0195025 A1  7/2016  Ajami et al.

OTHER PUBLICATIONS

Extended European Search Report and Opinion issued in connection with corresponding EP Application No. 18161446.2 dated Jul. 12, 2018, 5 pages.
U.S. Appl. No. 15/919,735, Non-Final Office Action dated Jun. 23, 2020, 32 pages.
U.S. Appl. No. 15/919,735, Final Office Action dated Oct. 5, 2020, 29 pages.

METHOD OF DETECTING FLAMEOUT IN A COMBUSTOR AND TURBINE SYSTEM

This application is a Continuation in Part of U.S. patent application Ser. No. 15/919,735 filed Mar. 13, 2018, the entire contents of which are hereby incorporated by reference.

TECHNICAL FIELD

Tech

Embodiments of the subject matter disclosed herein correspond to methods of detecting flameout in a combustor and turbine systems.

BACKGROUND

During operation of a turbine system a rare event called "flameout" may occur; "flameout" means that the flame of the combustor of the turbine system completely extinguishes.

Flameout is a very dangerous event; therefore, it should be detected as soon as it occurs and possibly corrective measures should be taken.

According to the prior art, at least one flame detector is located just inside the combustion chamber of the combustor of the turbine system.

Such flame detectors are designed to sense directly the presence of a flame so they are able to provide a very short response time.

Such flame detectors are subject to very hard operating conditions; this creates problems both from the construction and the operation point of view.

It would be desirable to improve the prior art.

SUMMARY

Therefore, the Inventors have thought of indirectly sensing the presence of the flame, in particular through operating parameters of the turbine system.

Embodiments of the subject matter disclosed herein relate to methods of detecting flameout in a combustor of a turbine system.

According to such embodiments, the method comprises the steps of: A) measuring angular acceleration of a shaft of a turbine of the system, B) calculating a flameout indicator as a function of the angular acceleration, and carrying out a comparison between the flameout indicator and a threshold.

Preferably, the flameout indicator is calculated also as a function of a pressure measured at an outlet of a compressor of the system, and of a thermal power generated by a combustor of the system.

Other embodiments of the subject matter disclosed herein relate to turbine systems.

According to such embodiments, the turbine system comprises a compressor, a combustor downstream of the compressor, a turbine downstream of the combustor, an angular acceleration detector associated to a shaft of said turbine, and a digital signal processing unit adapted to carry out a flameout detection method.

Preferably, the turbine system further comprises: a pressure detector associated to an outlet of the compressor, a temperature detector associated to an outlet of the turbine or another turbine, and an angular speed detector associated to a shaft of the turbine or another turbine.

It is to be noted that the present invention has been conceived for application in the field of "Oil & Gas".

BRIEF DESCRIPTION OF DRAWINGS

The accompanying drawings, which are incorporated herein and constitute an integral part of the present specification, illustrate exemplary embodiments of the present invention and, together with the detailed description, explain these embodiments. In the drawings.

DETAILED DESCRIPTION

The following description of exemplary embodiments refers to the accompanying drawings.

The following description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
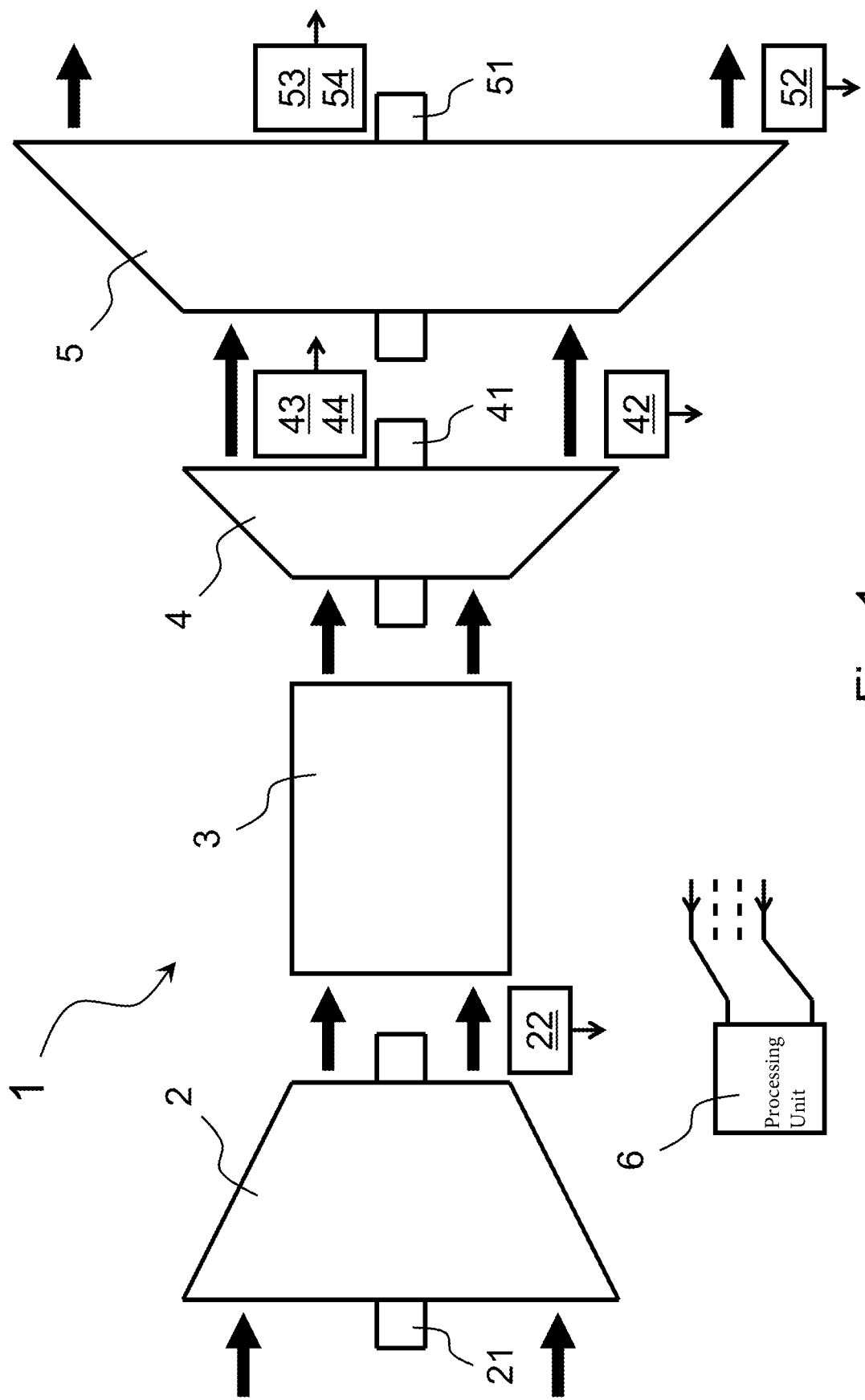
FIG. 1 shows a schematic diagram of a turbine system using a flameout detection method according to the subject matter disclosed herein.

FIG. 1 shows a turbine system 1 comprising: a compressor 2, a combustor 3, a first turbine 4 (that may be called "high-pressure turbine"), a second turbine 5 (that may be called "low-pressure turbine"), and a digital signal processing unit 6. Compressor 2 has an own shaft 21; the first turbine 4 has an own shaft 41; the second turbine 5 has an own shaft 51 (mechanically disconnected from shaft 41). An outlet of compressor 2 is fluidly connected to an inlet of combustor 3; an outlet of combustor 3 is fluidly connected to an inlet of turbine 4; an outlet of turbine 4 is fluidly connected to an inlet of turbine 5. It is to be noted that combustor 3 has at least another inlet (not shown in FIG. 1), for example a fuel inlet.

Furthermore, turbine system 1 comprises: a pressure detector 22 measuring pressure, for example the average pressure, at the outlet of compressor 2 (corresponding substantially to the inlet of combustor 3), a temperature detector 42 measuring temperature, for example the average temperature, at the outlet of turbine 4 (corresponding substantially to the inlet of turbine 5), a temperature detector 52 measuring temperature, for example the average temperature, at the outlet of turbine 5, an angular speed detector 43 measuring angular speed of shaft 41, an angular acceleration detector 44 measuring acceleration speed of shaft 41, an angular speed detector 53 measuring angular speed of shaft 51, an angular acceleration detector 54 measuring acceleration speed of shaft 51.

According to a typical embodiment, combustor 3 comprises a plurality of burners arranged annularly.

According to embodiment's alternative to the one of FIG. 1, the turbine system may comprise more than one compressor (for example serially connected) and/or one or two or three or more turbines (for example serially connected).

Digital signal processing unit 6 is electrically connected to detectors 22, 42, 43, 44, 52, 53, 54 and receives measure signals from these detectors.

In order to detect flameout of combustor 3, the following steps may be carried out:
a. measuring angular acceleration of a shaft of a turbine,
b. calculating a flameout indicator as a function of the angular acceleration,
and
C) carrying out a comparison between the flameout indicator and a threshold.

Considering turbine system 1 of FIG. 1, at step A, it is possible 1) to measure only acceleration of shaft 41 or 2) to measure only acceleration of shaft 51 or 3) to measure both accelerations and then, at step B, to use e.g. the product of both accelerations for calculating the flameout indicator. In fact, if the or each turbine downstream the combustor decelerates quickly, it is likely that flameout occurs.

Figure 2:
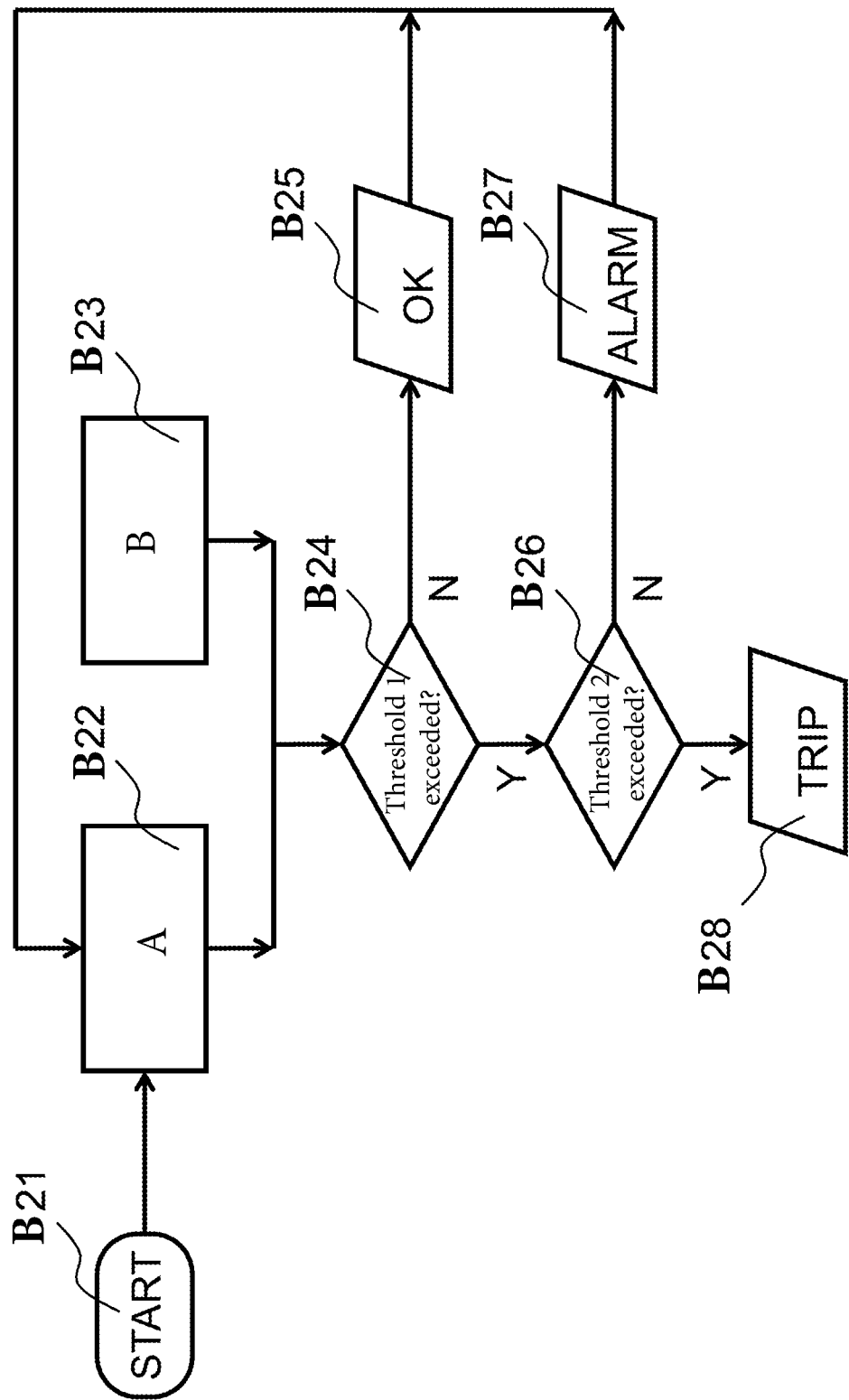
FIG. 2 shows a flowchart of an embodiment of a flameout detection method according to the subject matter disclosed herein.

In the flowchart of FIG. 2, there is a block B21 corresponding to a START and a block B22 corresponding to steps A and B.

The threshold at step B is typically fixed and may be predetermined or variable. If the threshold is variable, it may depend on a current load state of the turbine system 1; in FIG. 2, block B23 corresponds to a pre-calculation of one or more thresholds based on measured operating parameters of the turbine system 1; for this purpose, "load state of a turbine system" may be considered the power generated by the turbine system. According to some embodiments, it has been experimentally determined that one fixed and predetermined value of 0.2 is adequate for the threshold across an entire load range.

In the flowchart of FIG. 2, two different thresholds (i.e. threshold-1 and threshold-2) are used (see block B24 and block B26); in particular, the first threshold is lower than the second threshold (i.e. threshold-1<threshold-2). For most applications of the present invention, a single threshold is sufficient as it will be explained in the following.

In the flowchart of FIG. 2, block B24 corresponds to a comparison of the calculated flameout indicator with a first threshold (i.e. "is indicator>threshold-1 ?") and block B26 corresponds to a comparison of the calculated flameout indicator with a second threshold (i.e. "is indicator>threshold-2 ?"). A negative result N at block B24 indicates that combustor 3 is far from "flameout" and, subsequently to step C, "OK" is signaled at block B25; for example, digital signal processing unit 6 may send an ok signal to a remote monitoring unit or send no signal at all. A positive result Y at block B24 (i.e., the threshold is exceeded) may indicate that combustor 3 is either close to "flameout" or at "flameout". A negative result N at block B26 indicates that combustor 3 is close to "flameout" and, subsequently to step C, "ALARM" is signaled at block B27 (that may correspond to a step D); for example, digital signal processing unit 6 may send an alarm signal to a remote monitoring unit. A positive result Y at block B26 (i.e., the threshold is exceeded) indicates that combustor 3 is at "flameout" and, subsequently to step C, "TRIP" of turbine system 1 (i.e. switching-off) is carried at block B28 (that may correspond to a step D).

After blocks B25 and B27, the flow returns to block B22. This means that the "flameout indicator" is calculated repeatedly, in particular periodically; more precisely, at least steps A, B and C are cyclically repeated in time. The average repetition period may be in the range from e.g. 10 mS to e.g. 1000 mS.

It is to be noted that, according to a flowchart alternative to the one of FIG. 2, blocks B26 and B27 are not present, i.e. there is only one threshold, the turbine system is either considered "OK" or at "flameout", and at "flameout" the turbine system is simply switched-off.

It is to be noted that, according to a flowchart alternative to the one of FIG. 2, block B26 is not present and block B25 is located immediately before or after block B27, i.e. there is only one threshold, the turbine system is either considered "OK" or at "flameout", and at "flameout" an alarm is signaled and the turbine system is switched-off.

According to the embodiments just described, as soon as a threshold is reached an action is taken.

Alternatively, it may be provided that an action is taken only after a predetermined time or after a predetermined number of "consecutive positive results". For example referring to FIG. 2, if the average repetition period is 20 mS, it may be provided that "ALARM" is signaled after e.g. 1 or 2 consecutive positive results from the comparison at block 24 (corresponding approximately to 20 or 40 mS) and/or that "TRIP" occurs after e.g. 4 or 5 consecutive positive results from the comparison at block 26 (corresponding approximately to 80 or 100 mS). This means, in particular, that TRIP is decided only if deceleration proceeds for some (short) time.

A formula that may be used at step B is the following:

$$FO = -TNHA \frac{WFMNSL\_DMD}{P_3} \qquad \text{EQUATION 1}$$

wherein FO is a flameout indicator; TNHA is shaft acceleration, for example shaft acceleration measured by turbine speed increases; WFMNSL_DMD is fuel flow demanded by a current turbine operating set point, where the set point can be estimated by the turbine control system; and P3 is an axial compressor discharge pressure, which can be measured by pressure probes in the turbine."

TNHA may be the measured angular acceleration of the shaft of the first turbine or the measured angular acceleration of the shaft of the second/last turbine or the product of these angular accelerations.

P3 may be a pressure measured at an outlet of a compressor of the turbine system; referring to FIG. 2, it may be the average pressure measured at the outlet of compressor 2. This parameter, P3, is used to take into account any effect on the combustor due to any reduction of oxidant pressure (typically air pressure) provided to the combustor.

EQUATION 1 allows a very precise estimation of "flameout".

The flameout detection method according may be used in a turbine system like the one of FIG. 1 or in a system similar thereto.

The turbine system should comprise a digital signal processing unit adapted to carry out such flameout detection method; such unit typically comprises a software program for this purpose. In the embodiment of FIG. 1, such unit is labelled 6.

In order to carry out a flameout detection method, at least one detector is necessary, i.e. at least an angular acceleration detector (with reference to FIG. 1, detector 44 and/or detector 54); preferably, at least at least one angular accelerator detector (with reference to FIG. 1, detector 44 and/or detector 54) and at least one pressure detector (with reference to FIG. 1, detector 22) are used; more preferably, several detectors are used (with reference to FIG. 1, detectors 22, 42, 43, 44, 52, 53, 54).

The flameout detection method according to the subject matter disclosed herein allows to reliably and precisely and quickly detect flameout without any flame detector located just inside the combustion chamber of the combustor. In any case, the detection result from a flame detector may be used as a further safety measure.

The flameout detection method according to the subject matter disclosed herein allows to reliably and precisely and quickly detect flameout through the use of components (in particular sensors/detectors) that are normally already present in the turbine system for other purposes.

It is to be noted that a detection arrangement according to the subject matter disclosed herein may be specialized for a particular model of turbine system and/or may be calibrated before its use in an installed sample of turbine system. One parameter that requires particular care is the value of each threshold.

The invention claimed is:

1. A method of detecting flameout in a combustor of a turbine system, wherein the turbine system comprises an axial compressor upstream of said combustor, a first turbine downstream of said combustor, and a second turbine downstream of said first turbine, the method comprising the steps of:
   A) measuring a first angular acceleration of a first shaft of said first turbine, and measuring a second angular acceleration of a second shaft of said second turbine, the first shaft being mechanically disconnected from the second shaft;
   B) calculating a flameout indicator as a function of said first angular acceleration and said second angular acceleration, wherein said flameout indicator is calculated according to the formula:

$$FO=-TNHA(WFMNSL\_DMD/P_3)$$

wherein FO is said flameout indicator, TNHA is equal to the product of said first angular acceleration and said second angular acceleration, WFMNSL_DMD is a fuel flow demanded by a current turbine system operating set point, and P3 is a discharge pressure of said axial compressor;
   C) carrying out a comparison between said flameout indicator and a threshold;
   D) determining said flameout indicator exceeds the threshold in the comparison at least once; and
   E) tripping said turbine system in response to determining said flameout indicator exceeds the threshold in the comparison at least once.

2. The method of claim 1, wherein steps A, B, and C are cyclically repeated, and wherein determining said flameout indicator exceeds the threshold in the comparison at least once comprises determining said flameout indicator exceeds the threshold in the comparison more than once over a set of consecutive comparisons, wherein determining said flameout indicator exceeds the threshold in the comparison more than once over a set of consecutive comparisons indicates flameout.

3. The method of claim 1, further comprising calculating the threshold during operation of said turbine system.

4. The method of claim 1, further comprising signaling an alarm, to be performed after step C or after step E.

5. A turbine system comprising:
   an axial compressor;
   a combustor downstream of said axial compressor;
   a first turbine downstream of said combustor, said first turbine comprising a first shaft;
   a second turbine downstream of said first turbine, said second turbine comprising a second shaft, the first shaft of said first turbine being mechanically disconnected from the second shaft of said second turbine;
   a first angular acceleration detector configured to measure a first angular acceleration of the first shaft of said first turbine;
   a second angular acceleration detector configured to measure a second angular acceleration of the second shaft of said second turbine; and
   a digital signal processing unit in communication with the first angular acceleration detector and the second angular acceleration detector, the digital signal processing unit configured to:
   A) receive said first angular acceleration of the first shaft of said first turbine from the first angular acceleration detector and receive said second angular acceleration of the second shaft of said second turbine from the second angular acceleration detector;
   B) calculate a flameout indicator as a function of said first angular acceleration and said second angular acceleration, wherein said flameout indicator is calculated according to the formula:

$$FO=-TNHA(WFMNSL\_DMD/P_3)$$

wherein FO is said flameout indicator, TNHA is equal to the product of said first angular acceleration and said second angular acceleration, WFMNSL_DMD is a fuel flow demanded by a current turbine system operating set point, and P3 is a discharge pressure of said axial compressor;
   C) compare said flameout indicator with a threshold; and
   D) trip said turbine system in response to said flameout indicator exceeding the threshold.

6. The turbine system of claim 5, further comprising:
   a pressure detector at an outlet of said axial compressor and a temperature detector at an outlet of either said first turbine or said second turbine.

7. The method of claim 1, wherein said flameout indicator exceeding the threshold in the comparison at least once indicates flameout.

* * * * *